United States Patent
Hauber et al.

(10) Patent No.: US 10,179,574 B2
(45) Date of Patent: Jan. 15, 2019

(54) BRAKE SYSTEM, METHOD FOR OPERATING SAME

(71) Applicant: Robert Bosch GmbH, Stuttgart (DE)

(72) Inventors: Simon Hauber, Freiberg Am Neckar (DE); Tobias Putzer, Bad Friedrichshall (DE)

(73) Assignee: Robert Bosch GmbH, Stuttgart (DE)

(*) Notice: Subject to any disclaimer, the term of this patent is extended or adjusted under 35 U.S.C. 154(b) by 30 days.

(21) Appl. No.: 15/000,202

(22) Filed: Jan. 19, 2016

(65) Prior Publication Data

US 2016/0207510 A1    Jul. 21, 2016

(30) Foreign Application Priority Data

Jan. 21, 2015 (DE) .................. 10 2015 200 928

(51) Int. Cl.
*B60T 8/17* (2006.01)
*B60T 8/175* (2006.01)
*B60T 8/1755* (2006.01)
*B60T 8/88* (2006.01)
*B60T 13/66* (2006.01)
*B60T 13/74* (2006.01)
*B60T 7/04* (2006.01)
*B60T 7/12* (2006.01)

(52) U.S. Cl.
CPC .............. *B60T 8/17* (2013.01); *B60T 7/042* (2013.01); *B60T 7/12* (2013.01); *B60T 8/175* (2013.01); *B60T 8/1755* (2013.01); *B60T 8/885* (2013.01); *B60T 13/662* (2013.01); *B60T 13/74* (2013.01); *B60T 2270/402* (2013.01)

(58) Field of Classification Search
None
See application file for complete search history.

(56) References Cited

U.S. PATENT DOCUMENTS

2015/0203082 A1* 7/2015 Forster ............... B60T 7/08
                                                    701/70
2017/0072920 A1* 3/2017 Besier ............... B60T 7/22

OTHER PUBLICATIONS

German Association of the Automotive Industry; Recommendation for integration of Electric Parking Brakes control into ESC Control Units, VDA 305-100; May, 2013; 100 pages; Verband der Automobilindustrie, Berlin, Germany.

* cited by examiner

*Primary Examiner* — Mussa A Shaawat
*Assistant Examiner* — Abdhesh K Jha
(74) *Attorney, Agent, or Firm* — Maginot, Moore & Beck LLP

(57) ABSTRACT

The disclosure relates to a brake system of a motor vehicle having at least one parking brake which can be activated, having a plurality of means for operating the parking brake and having at least one control device which has at least one of the means, characterized in that at least one further control device has at least another of the means.

6 Claims, 7 Drawing Sheets

BRAKE SYSTEM, METHOD FOR OPERATING SAME

This application claims priority under 35 U.S.C. § 119 to application no. DE 10 2015 200 928.9, filed on Jan. 21, 2015 in Germany, the disclosure of which is incorporated herein by reference in its entirety.

BACKGROUND

The method relates to a brake system of a motor vehicle and to a method for operating such a brake system. The brake system has at least one parking brake which can be activated as well as means for operating the parking brake. Furthermore, the parking brake has at least one control device which has or makes available at least one of the means for operating the parking brake.

Brake systems of the type mentioned at the beginning are known from the prior art. In this context, there are different designs of parking brakes, wherein a common design is a parking brake which is embodied integrated into a conventional wheel brake. In this respect, for example electrical-motor-powered activation of the brake shoe is provided for the parking brake in addition to hydraulic activation of a brake shoe. Because the manufacturers frequently do not manufacture all the components themselves, parts of the brake system are now also obtained from third-party suppliers. In particular the integration of a parking brake of a third-party supplier into the manufacturer's own brake system requires solutions which permit simple actuation of the wheel brake and of the parking brake. In an VDA Recommendation (305-100), the "Kreuztausch" model is described. Here, an interface is shown which integrates a parking brake of a third-party supplier into an existing brake system. In this context, the manufacturer of the brake system makes available a control device with hardware and software environments, in which, in particular, a software package for actuating the parking brake can be integrated as a means for the operation thereof. The control device of the brake system therefore has means for operating the parking brake, in particular software for operating the parking brake. Of course, the control device must also have corresponding electrical interfaces by means of which the signal-technical and electrical connection to the, for example, electric-motor driver of the parking brake is ensured. In this context, the software of the parking brake communicates with the parking brake via the software of the control device, that is to say via the software of the brake system, with the result that ultimately the software of the control device or the control device itself communicates directly with components of the parking brake and, if appropriate, signals back measurement variables or the like to the part of the control device which operates the parking brake.

SUMMARY

The brake system according to the disclosure has the advantage that the known concept is expanded and as a result made safer, wherein optimization with respect to the functions to be carried out can be achieved. The brake system according to the disclosure is defined by the fact that at least one further control device has at least another of the means for operating the parking brake. There is therefore provision that parts of the one control device are taken over by other control devices in terms of hardware and/or software technology. In particular, there is provision here that the plurality of control devices together form a virtual host, and the functions of the original control device which are provided for the parking brake are exported to different control devices. By means of the virtual host, the different resources which are present, such as, for example, control device pins or computer capacity can be optimized or utilized better. The architecture of the brake system, having, in particular, an ESP control device, booster, recuperation and/or further driving comfort systems such as sensor clusters, rear body ICU or DCU, can be configured in such a way that the tasks of the original control device are distributed advantageously in the system assembly. At the same time, the portion which has to be made available by the third-party supplier, that is to say the parking brake itself, and the software which is necessary for actuation, is the same and is independent of which control device the software runs on and which control device the parking brake is actuated with.

According to one advantageous development of the disclosure there is provision that the means forms surroundings for methods which are to be carried out in order to activate the parking brake. The means form here, as already mentioned above, the virtual host which is distributed among a plurality of control devices and carries out and coordinates different methods or method components for operating the parking brake.

Furthermore there is preferably provision that each of the control devices has at least one processor. The processor serves to make available the virtual host, wherein the control devices communicate with one another in order to make available the common virtual host. As a result, a plurality of interfaces are provided by a plurality of control devices which can be optimized to the respective task, wherein at the same time a common virtual host is made available.

According to one preferred development of the disclosure, there is also provision that one of the control devices is an ESP control device. An ESP control device is understood to be a control device which carries out safety-relevant braking functions for the motor vehicle automatically. The term ESP is understood here to mean the electronic stability program which is now standard in many motor vehicles.

In addition there is preferably provision that one of the control devices is embodied as a power module or power control device. The power module is provided here, in particular, for operating an electric-motor-powered drive of the parking brake. As a result of the fact that the power module is arranged in a separate control device, or is formed by a separate control device, it can be arranged, in particular, close to the parking brake, with the result that electric leads between the power module and the parking brake or the electric-motor-powered drive for the parking brake can be made relatively short, which reduces power losses.

In particular, it is therefore provided that the power module is arranged in the region of or near to the parking brake.

Furthermore, there is preferably provision that one of the control devices is embodied as a reserve control device, that is to say as a control device which, in the event of failure of the original control device, takes over the function of the original control device. A system is therefore provided with these two control devices which can basically carry out the same functions, wherein at least one of the control devices is assigned the means for operating the parking brake, wherein the latter control device is used in the normal operating mode for operating the parking brake and is used to operate the entire brake system only in an emergency.

According to one advantageous development of the disclosure there is provision that one of the control devices is embodied as a brake boosting control device. Therefore, for example electrohydraulic brake boosting is open-loop or closed-loop controlled by means of the separate brake boosting control device.

Furthermore it is conceivable that two or more of the abovementioned control devices are combined in one control device unit.

The method according to the disclosure and having the features of one embodiment is defined by the fact that at least one further part of the method for operating the parking brake is carried out by a further control device. This results in the advantages already mentioned above. Further features and advantages can be found described above.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
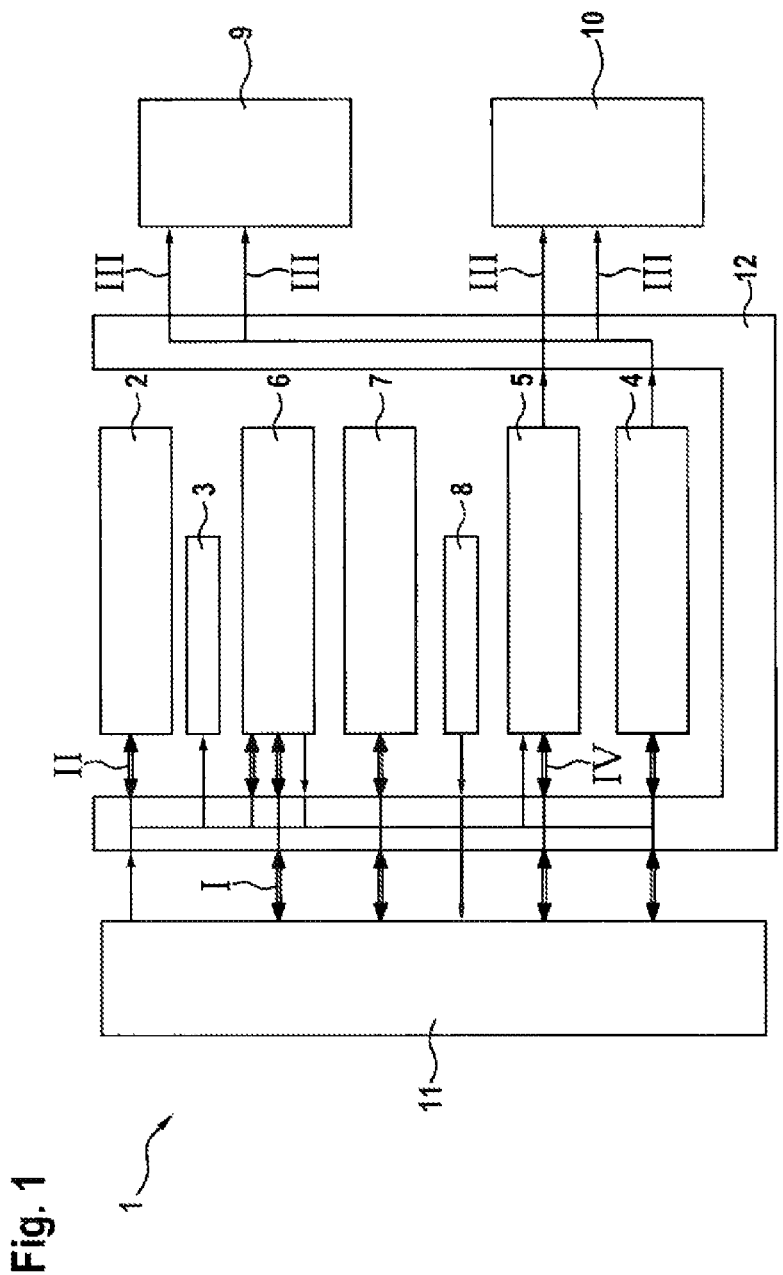
FIG. 1 shows a system architecture of a virtual host.

FIG. 1 shows a simplified illustration of a system architecture for a brake system 1 of a motor vehicle. The brake system 1 has a human-machine interface (HMI interface) 2 by means of which a driver of the motor vehicle can express a parking brake request, for example by activating a switch. Furthermore, the brake system 1 has a brake light controller 3 and a control device 4 with power electronics for operating at least one electric motor of at least one parking brake which is assigned to a wheel of the motor vehicle, wherein the control device preferably has at least one H bridge for supplying voltage to the electric motor or motors and, in particular, at least one measuring device for measuring the voltage and/or current. Furthermore, the brake system 1 has a control device 5 which is embodied as an ESP control device and applies a hydraulic pressure to a wheel brake of the motor vehicle individually in order to activate said wheel brake. For this purpose, a hydraulic actuator 15 is assigned to the control device 5, said hydraulic actuator 15 having, in particular, a pressure generator and a plurality of valves for performing open-loop and/or closed-loop control of the pressure which acts on the wheel brakes.

Furthermore, programs which are to be executed and software packages which serve, for example, to monitor the activation of the parking brake or parking brakes (functional checking, block 6) or to execute diagnostic methods (block 7) in order to monitor the brake system 1 of the motor vehicle during operation belong to the system architecture of the parking brake 1. Furthermore, a surrounding sensor system 8 is provided by means of which data from the surroundings of the motor vehicle, such as for example the external temperature, gradient of the roadway or the like, can be determined In the present exemplary embodiment, the brake system 1 has two parking brakes 9 and 10 which are assigned to the wheels of a rear axle of the motor vehicle.

In addition, the brake system 1 has software which is made available by the manufacturer of the parking brakes 9, 10, said software being shown as a block 11 and being executed via the brake system 1.

In this context there is advantageously provision that the hardware components of the brake system 1, in particular the control devices 5 and 4, make available together a virtual host 12 which is made available as an interface between the individual components of the brake system 1. Via the virtual host 12, for example an activation request I is transmitted to the software in block 11, the activation of the switch of the human-machine interface 2 is signaled according to the double arrow II or feedback is given to the user, the electric motors of the wheel brakes 9, 10 are actuated, as indicated by arrows III, and/or a hydraulic brake activation is carried out according to double arrow IV.

FIG. 1 illustrates that the components of the parking brake system 1, in particular the control devices 4, 5 and the means for operating the parking brakes 9, 10, in particular the software block 11 and the various checking and diagnostic functions, communicate with one another via the virtual host 12 and can be exported individually. The communication is preferably carried out by means of a protocol such as, for example, Flexray or CAN.

Figure 2:
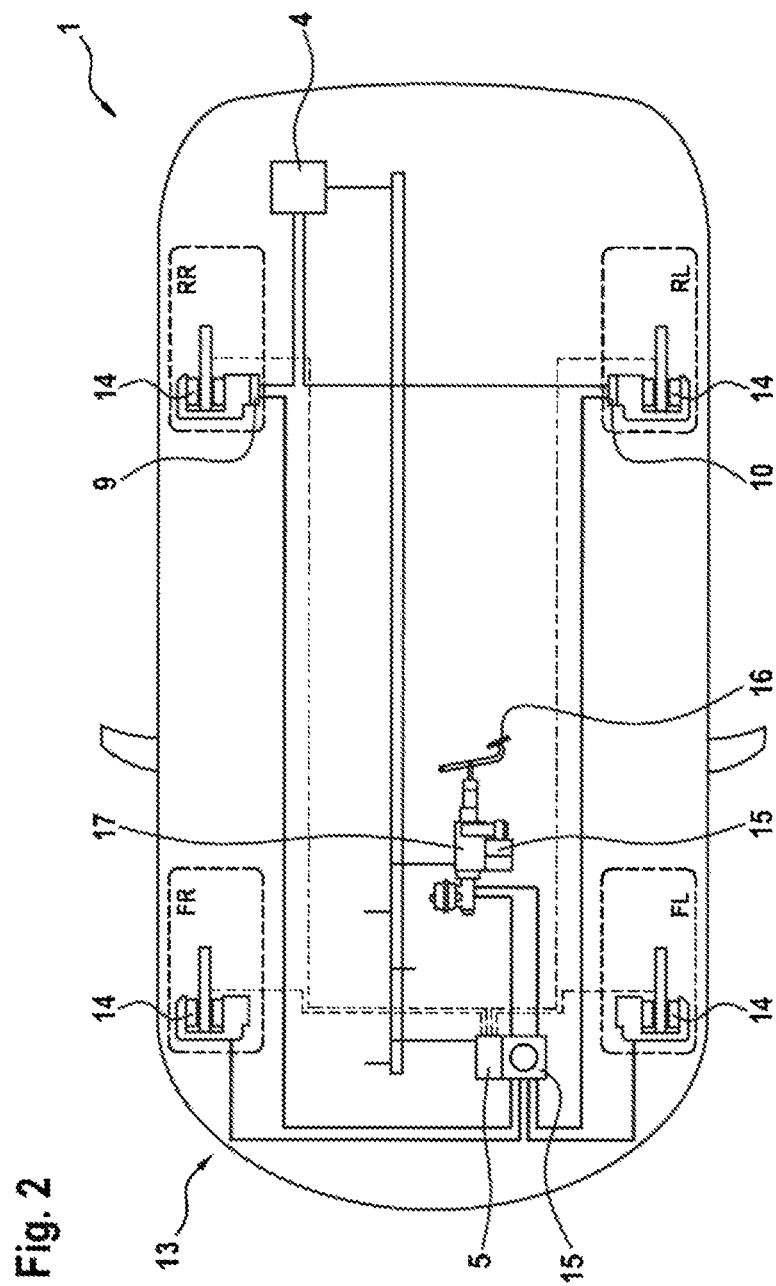
FIG. 2 shows a first exemplary embodiment.

FIG. 2 shows a motor vehicle 13 which has the brake system 1. For this purpose, each wheel is assigned a wheel brake 14 which can be activated hydraulically. For this purpose, the wheel brakes 14 are operatively connected to the hydraulic actuator 15 which has already been mentioned above and can be operated by means of the control device 5. Connected upstream of the hydraulic actuator 15 is a master brake cylinder 17 which can be activated by means of a brake pedal 16 and has a brake booster.

Furthermore, the parking brakes 9, 10 which have already been mentioned above are assigned to the wheels RR, RL of the rear axle of the motor vehicle 13.

According to the exemplary embodiment illustrated in FIG. 2 there is provision that as in conventional brake systems there is provision to carry out the customary braking tasks by means of the control device 5, only the function block for actuating the parking brakes 9, 10 being exported into the control device 4, which is arranged at the rear of the motor vehicle 13 in the vicinity of the parking brakes 9, 10. This produces the advantage that as a result of the spatial proximity of the control device 4 to the rear axle short electric leads with low resistances can be implemented, which gives rise to a better system performance and lower power costs. In this variant, it is also irrelevant whether the brake system 1 is equipped with an electronic brake booster or a conventional brake booster. An additional safety aspect results from the fact that the hardware for operating the parking brakes 9, 10 is exported into the control device 4. As a result, specifically a further fallback level for automated functions, in particular at low speeds, can be implemented. In the event of failure of the control device 5, the control device 4 can close the parking brake automatically.

Figure 3:
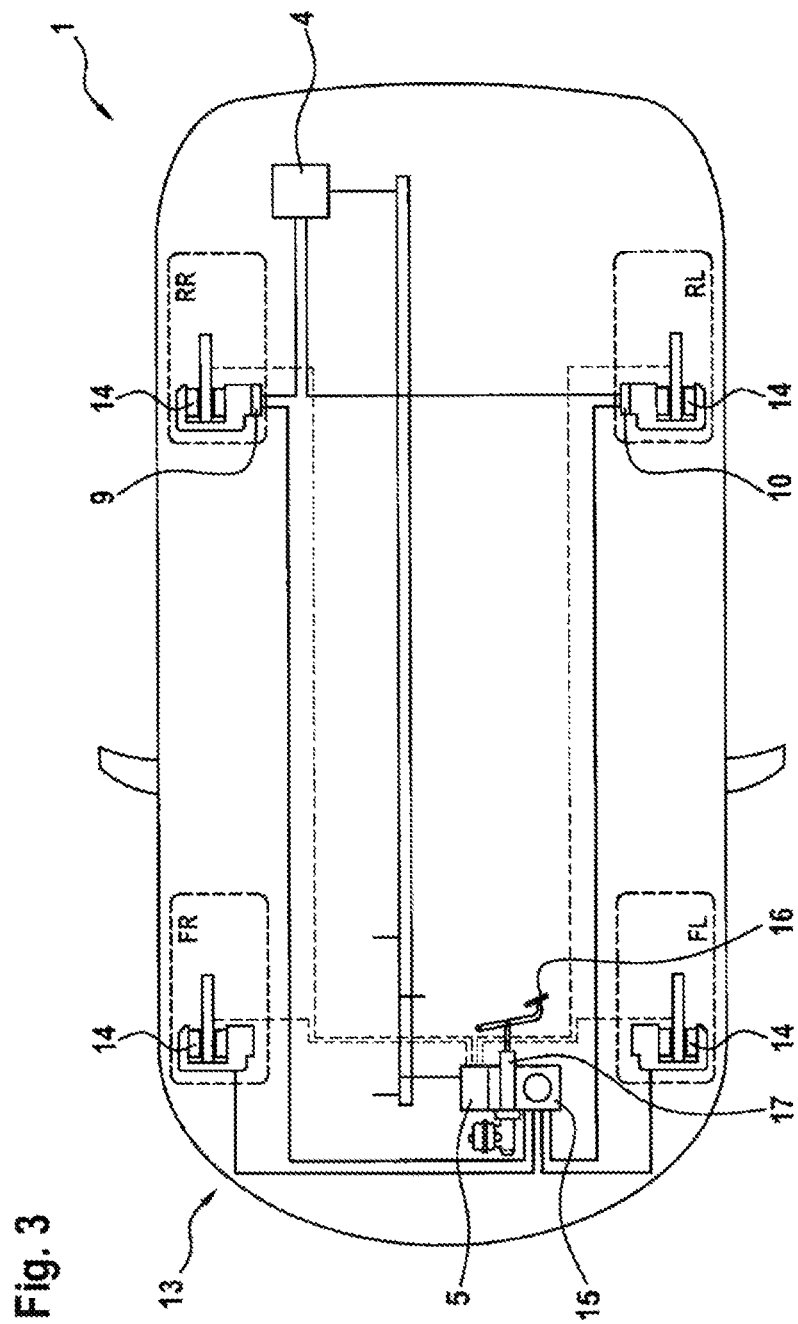
FIG. 3 shows a second exemplary embodiment.

FIG. 3 shows a further exemplary embodiment of the motor vehicle 13 with the brake system 1. In contrast to the preceding exemplary embodiment, there is provision here that the brake booster and ESP system are combined and take over the function of the ESP control device 5 and of the hydraulic actuator 15. In this variant, as described above, the control device 4, which also takes over the safety functions of the brake system in the event of failure of the control device 5, is additionally provided.

Figure 4:
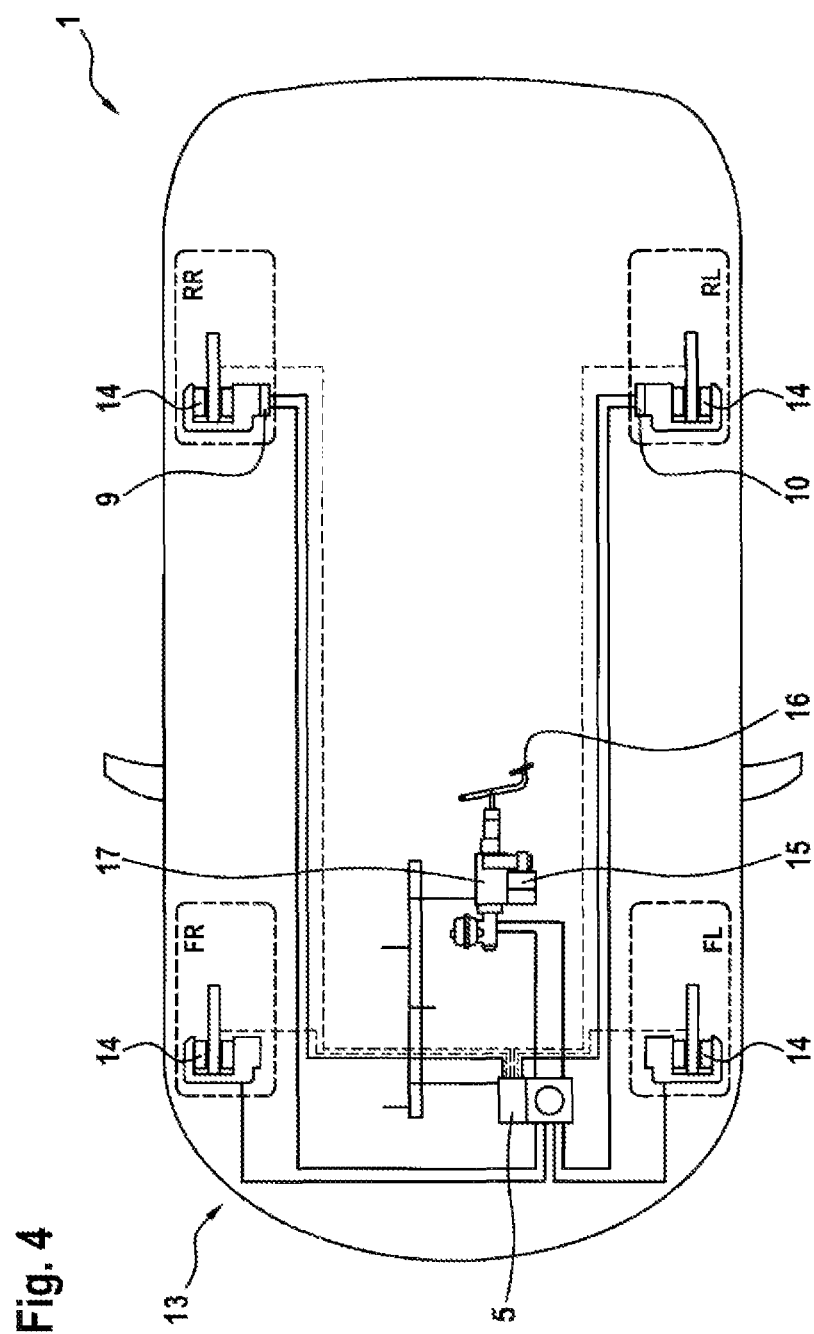
FIG. 4 shows a third exemplary embodiment.

FIG. 4 shows a third exemplary embodiment in which, in contrast to the preceding exemplary embodiments, the hydraulic actuator 15 is exported into the brake booster system component. In this variant, the brake system 1 can be configured in such a way that a large part of the hydraulic load collective is transmitted to the electronic brake booster. In contrast to the preceding exemplary embodiment, the control device 4 is integrated into the ESP control device 5 here.

Figure 5:
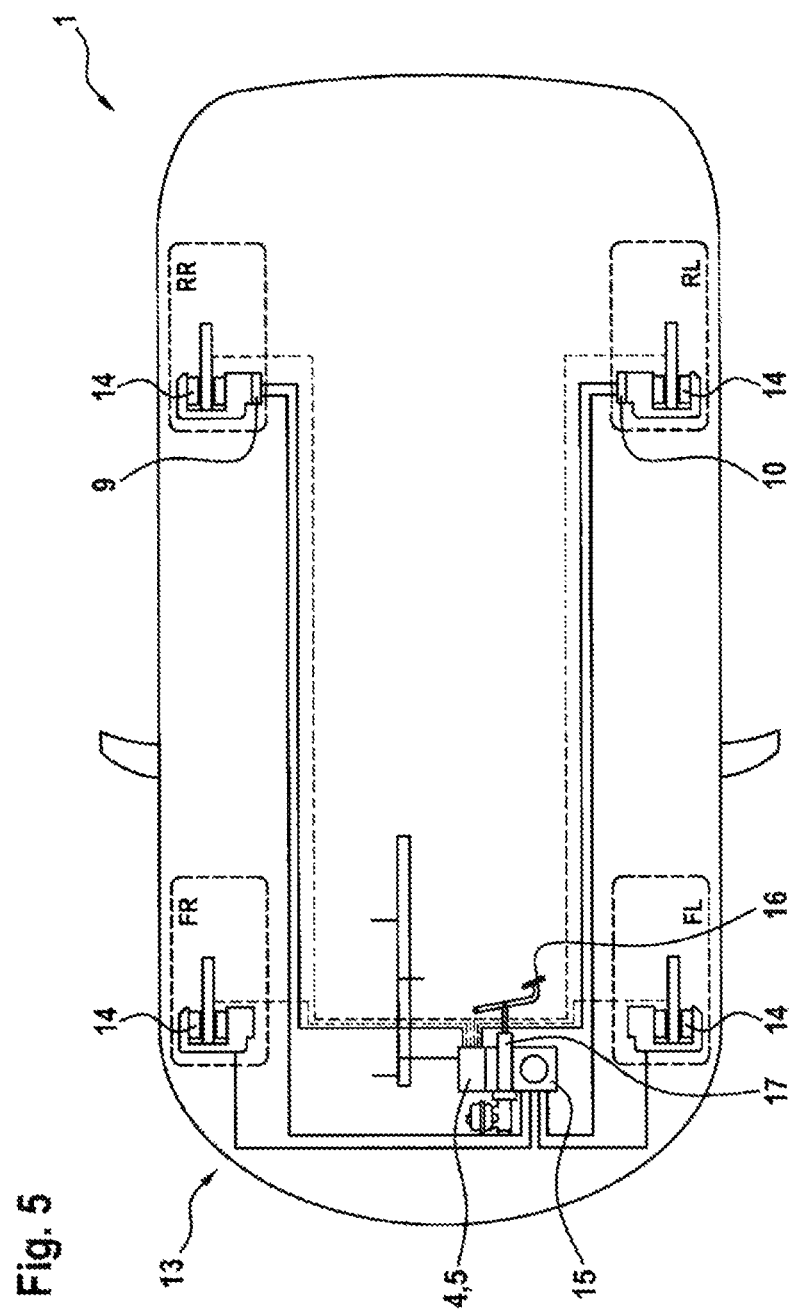
FIG. 5 shows a fourth exemplary embodiment.

FIG. 5 shows a fourth exemplary embodiment in which, in contrast to the preceding exemplary embodiment, the master brake cylinder 17 and brake booster form, as already described in FIG. 3, an integrated power brake in combination with the hydraulic actuator 15 and the control device 5 and the control device 4.

Figure 6:
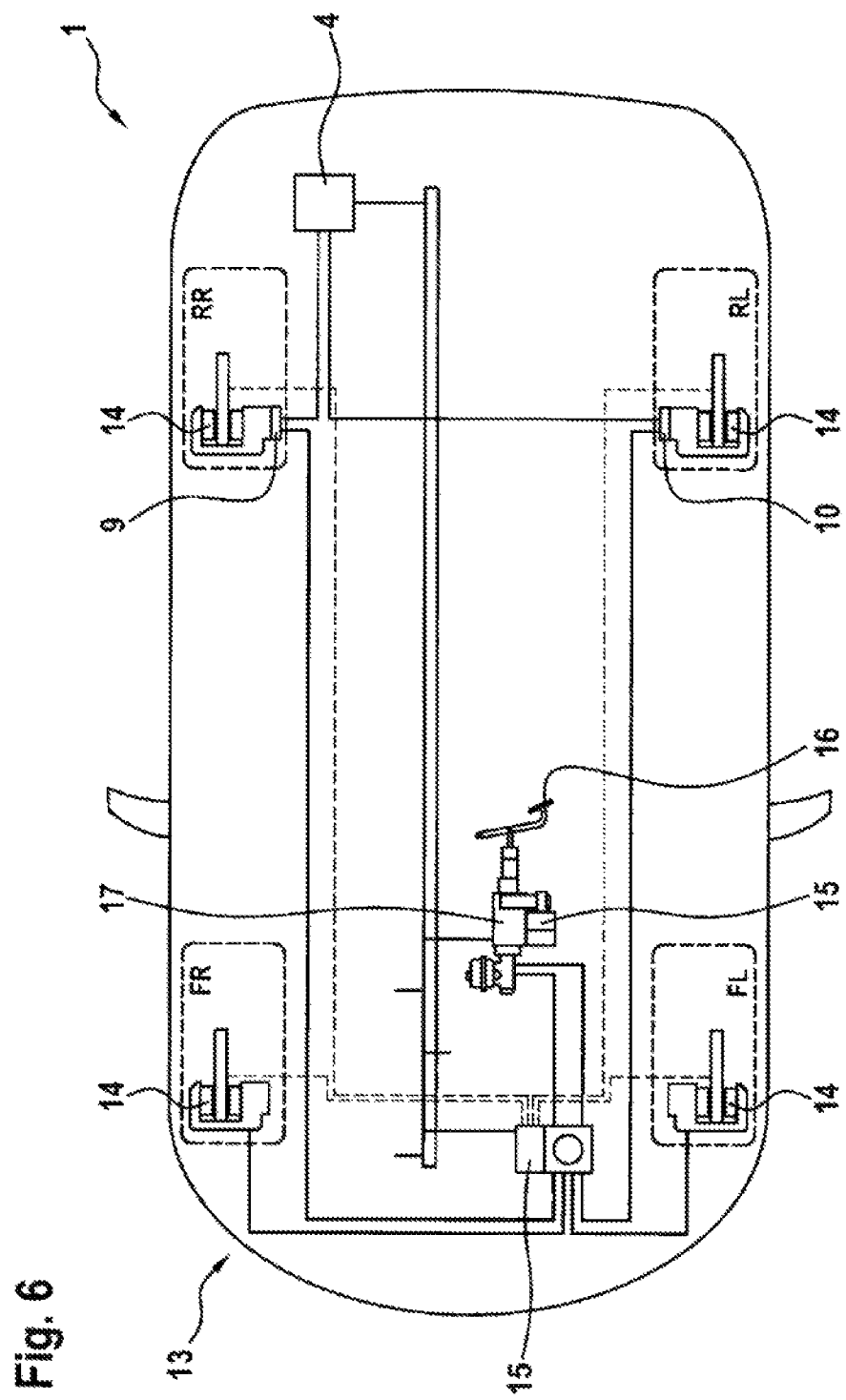
FIG. 6 shows a fifth exemplary embodiment.

FIG. 6 shows a fifth exemplary embodiment which corresponds essentially to the exemplary embodiment in FIG. 2, with the difference that the hydraulic actuator 15 is added to the activation unit composed of the master brake cylinder and brake booster 17.

Figure 7:
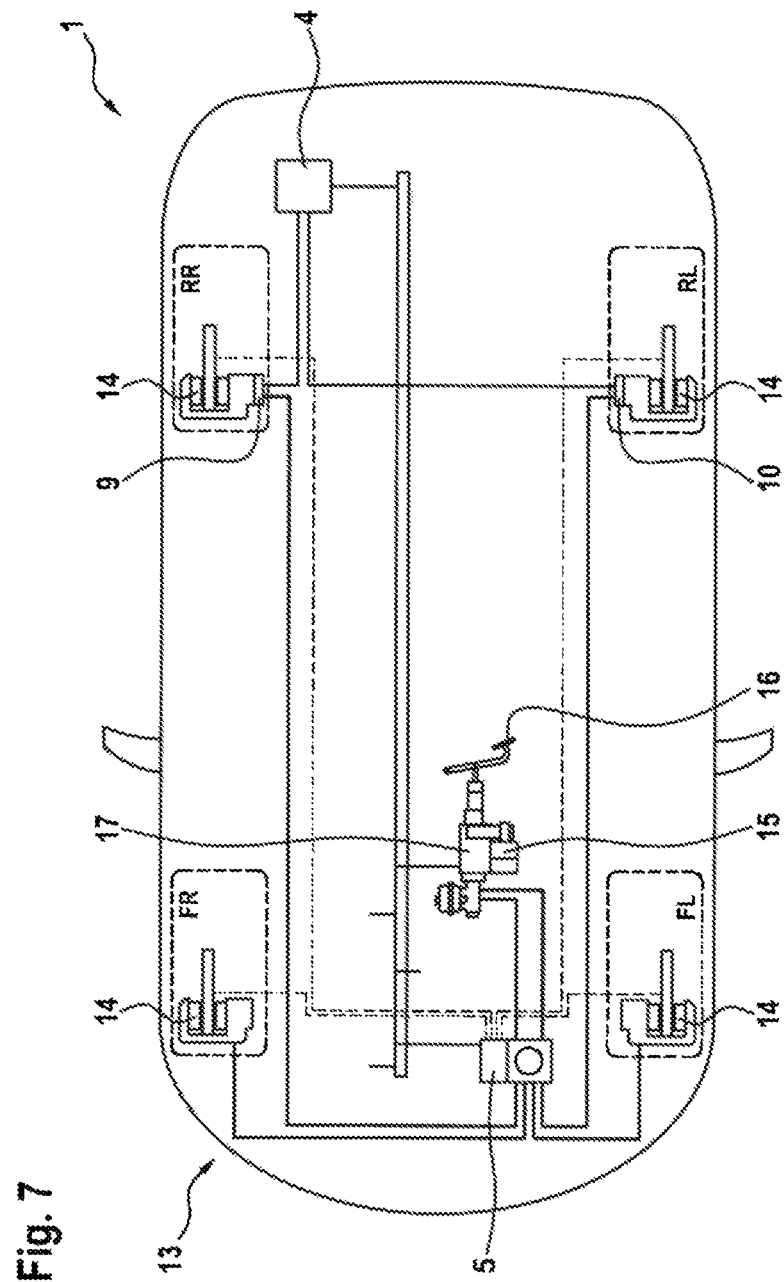
FIG. 7 shows a sixth exemplary embodiment.

According to a sixth exemplary embodiment there is provision that the control device 5 no longer takes over any tasks with respect to the parking brake, wherein the software runs completely in an electronic brake booster, and the function of the hydraulic actuator 15 is also carried out in the electronic brake booster, as is shown by way of example in FIG. 7.

What is claimed is:

1. A brake system of a motor vehicle, comprising:
   at least one parking brake configured to be activated;
   a first control device electrically connected directly to the at least one parking brake by a first electrical connection and configured to operate the at least one parking brake by way of the first electrical connection;
   a second control device separate from the first control device, electrically connected directly to the at least one parking brake by a second electrical connection, and configured to operate the at least one parking brake by way of the second electrical connection; and
   a virtual host including the first control device and the second control device, the virtual host configured to carry out and to coordinate methods for operating the at least one parking brake via the first control device and the second control device,
   wherein one of the first control device and the second control device is configured as a power module,
   wherein the power module is arranged in a region of the at least one parking brake,
   wherein the power module is configured to operate an electric-motor-powered drive of the at least one parking brake,
   wherein the virtual host is electrically connected to a human-machine interface, a brake light controller, a brake activation monitor, a diagnostic system, and a surrounding sensor system, and
   wherein the virtual host enables the first control device and the second control device to communicate electronically with the human-machine interface, the brake light controller, the brake activation monitor, the diagnostic system, and the surrounding sensor system.

2. The brake system according to claim 1, wherein:
   the first control device includes a first processor,
   the second control device includes a second processor, and
   the first and second processors are configured to enable the first and second control devices to communicate with each other via the virtual host.

3. The brake system according to claim 1, wherein one of the first control device and the second control device is further configured as an electronic stability program control device.

4. The brake system according to claim 1, wherein:
   the second control device is configured as a reserve control device, and
   the reserve control device takes over a function of the first control device in response to a failure of the first control device.

5. The brake system according to claim 1, wherein one of the first control device and the second control device is configured as a brake boosting control device.

6. The brake system according to claim 1, wherein:
   the first control device is configured to control a first function of the at least one parking brake,
   the second control device is configured to control a second function of the at least one parking brake, and
   the first function is different from the second function.

* * * * *